Feb. 20, 1945.  E. WALDER ET AL  2,370,096

COFFEE MAKER

Filed Nov. 12, 1942

Inventors:—
Emil Walder
Joseph W. Myers
by their Attorneys
Howson & Howson

Patented Feb. 20, 1945

2,370,096

UNITED STATES PATENT OFFICE 2,370,096

COFFEE MAKER

Emil Walder and Joseph W. Myers, Philadelphia, Pa., assignors to Proctor & Schwartz, Inc., Philadelphia, Pa., a corporation of Pennsylvania Application November 12, 1942, Serial No. 465,346

4 Claims. (Cl. 99—292)

This invention relates to coffee makers, and more particularly to coffee makers of the well-known vacuum type which employ a filter element to provide a clear beverage.

In the past, coffee makers of this type have employed filter elements utilizing fabric material or the like to filter or strain the coffee beverage as it is drawn downward into the lower vessel. Such devices are objectionable for a number of reasons, among which are the following.

It is difficult to cleanse the filter element, and no matter how carefully and thoroughly this element is cleansed, it will in time affect the flavor of the coffee.

Such a filter element is unsanitary due to its construction and manner of use.

The filter element must be replaced periodically, not only for the above reasons, but also because it deteriorates with use, and its deterioration is aggravated by the necessary frequent washing of the element.

The periodic replacement of the element not only involves inconvenience, but also involves the expenditure of money as well.

The principal object of the present invention is to provide an improved coffee maker of this type which eliminates the above-mentioned objections and disadvantages.

Another object of the invention is to provide, in such a coffee maker, a novel filter device which is easy to clean and is sanitary, and which does not adversely affect the flavor of the coffee beverage and does not require replacement.

A still further object of the invention is to provide a device of this character in which a compressed body of the ground coffee is utilized as the filtering means.

Other objects and features of the invention will appear hereinafter.

Figure 1:
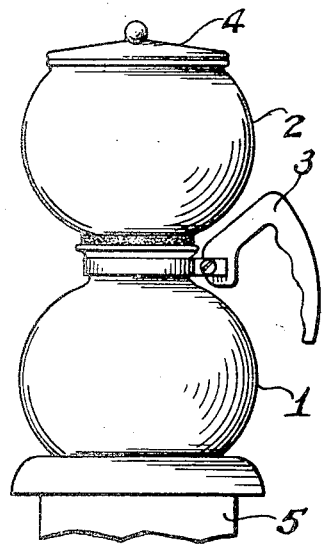
Figure 1 is an elevational view, on a small scale, of a vacuum type coffee maker embodying the present invention.

As shown in Fig. 1, the coffee maker provided by this invention comprises the usual water heating vessel 1 and the coffee infusion vessel 2 of a vacuum type coffee maker. The vessel 1 is provided with a suitable handle 3, and a lid 4 serves to close the top of the upper vessel 2. The coffee maker is used in conjunction with a suitable heater 5.

Figure 2:
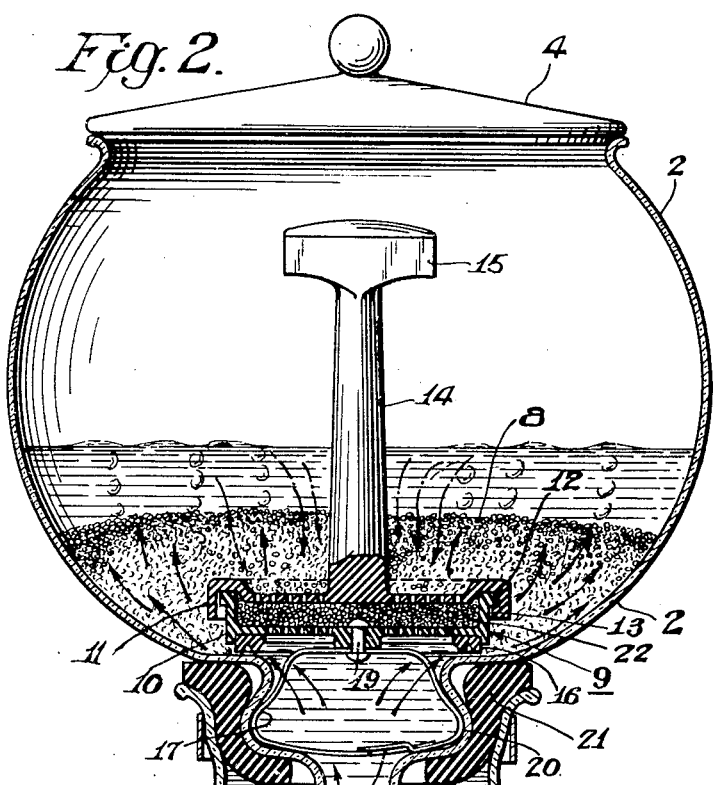
Figure 2 is a sectional view of the coffee maker.

Referring to Fig. 2, the vessel 2 has the usual tubular portion 6 extending downward into the vessel 1 and adapted to conduct liquid between the two vessels. In operation of this type of coffee maker, the water 7 in vessel 1 is heated and rises upward through the tube 6 into vessel 2, as indicated by the full line arrows. In the upper vessel 2, the heated water comes into contact with the ground coffee 8, and the infusion of the two forms the coffee beverage. When substantially all of the heated water has risen into the vessel 2, the applied heat is shut off, and the vacuum created within vessel 1 draws the coffee beverage downward through the filter device, as indicated by the broken line arrows.

Figure 3:
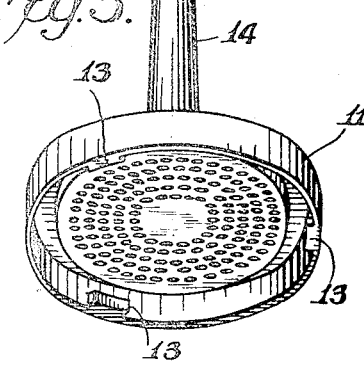
Figures 3 and 4 are perspective views of the two parts of the filter device.

In accordance with the present invention, there is provided a novel filter device 9 which is adapted to contain a predetermined quantity of ground coffee in compressed state. As shown more clearly in Figs. 3 and 4, the filter device comprises two parts 10 and 11. Part 10 is in the form of a shallow cup-like container having a foraminated base, while part 11 is in the form of a foraminated lid or cover for the said container. The container 10 is of such size and shape that it will receive a predetermined quantity of finely ground coffee when it is filled to a line or plane level with its upper edge. Preferably, the container is adapted to receive one unit of the ground coffee, as will be explained more fully later.

Figure 4:
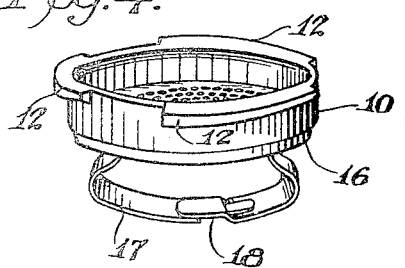

The parts 10 and 11 are provided with cooperative means for securing the cover 11 in place and also for causing the cover to compress the ground coffee within the container 10. Such means comprises outwardly extending projections 12 on container 10 and inwardly extending projections 13 on cover 11. These elements are arranged so that the projections 13 may be inserted in the spaces between projections 12, and the cover 11 may then be rotated to interlock the said projections. The lower surfaces of projections 12 are inclined, as shown in Fig. 4, to provide cam surfaces which cause the cover 11 to exert pressure on the coffee within the container 10. To this end the cover is slightly dished, as shown in Fig. 2, and it is provided with a relatively long handle 14 having a gripping knob 15 at the end thereof.

The container 10 carries a resilient sealing ring 16, and it also carries a spring member 17 whose ends are slidably interfitted as shown at 18. This spring member 17, which is preferably formed of resilient metal, may be secured to container 10 by means of a rivet 19 or the like. The lower portion of vessel 2 is formed to provide a horizontal annular surface upon which the sealing ring 16 may seat and to provide a recessed portion 20 corresponding in cross section to the shape of the spring member 17 and adapted to receive the latter. When the filter device is in place, as shown in Fig. 2, it is permitted to move upward slightly by virtue of the resilience of spring 17. The purpose of this will be explained presently.

A sealing member 21 is provided between the upper part of vessel 1 and the lower portion of vessel 2, as is customary in such devices.

In using the coffee maker, the user first places the desired quantity of water in vessel 1 and then inserts the empty vessel 2 in place, with the lid 4 removed. The user then fills the container 10 with finely ground coffee, removing any excess coffee above a level with the upper edge of the container. The cover 11 is then applied and rotated as described above, thereby compressing the ground coffee as shown at 22 in Fig. 2. This operation is facilitated by the handle 14 and its knob 15. The user then inserts the filter device within the vessel 2, forcing the spring member 17 into the recessed portion 20 of vessel 2. The freedom of the ends of the spring member to slide relative to one another permits the insertion of the spring member as described. The user then places enough ground coffee within vessel 2 to provide the necessary total quantity of ground coffee for the desired quantity of beverage. For example, if the quantity of beverage desired requires four units of ground coffee, one unit will be placed in the filter device, while three units will be placed in a loose state in the vessel 2, as illustrated.

In operation, the heated water rises through tube 6 and exerts an upward force on the filter device, causing it to rise slightly, as shown in Fig. 2. Substantially all of the rising water passes about the filter device, since the compressed body of coffee within the filter device presents high resistance to the passage of the water therethrough. However, the compressed ground coffee within the filter device becomes moistened and swells, thereby compressing this coffee to an even greater extent. The upward stream of water passing through the small space between the slightly raised sealing ring 16 and the wall of vessel 2 prevents the loosely ground coffee from moving downward.

When substantially all of the water has risen into vessel 2, the filter device is lowered into sealing relation with the wall of vessel 2 by the action of spring member 17 and the weight of the water and of the device itself. As the coffee beverage is drawn downward by the vacuum in vessel 1, it is forced to pass through the filter device. The compressed body of finely ground coffee within the filter device serves as a very efficient filtering means, with the result that the beverage is entirely free of any ground coffee.

After the coffee has been made, as described above, the user removes the filter device from vessel 2 and then removes the cover 11 of said device. The coffee within the container 10 is compressed into a substantially solid state and may be readily removed by rinsing under a faucet.

The speed of filtering varies to some extent inversely with the degree of compression of the ground coffee within the filter device. The clarity of the filtered beverage also varies to some extent directly with the degree of compression. Thus an increase in filtering speed may be obtained, at some sacrifice of the degree of clarity, by turning the cover 11 less than the usual amount, which results in a lesser degree of compression of the ground coffee.

From the foregoing description, it will be seen that the invention provides a novel apparatus for making coffee which eliminates the objectionable features of prior coffee makers of this type and has various advantages as hereinbefore set forth. The filter device provided by the invention may be constructed of any suitable material. For example, the principal parts of this device may be formed of Bakelite, plastic, or other suitable material, while the sealing ring 16 may be formed of rubber or the like.

It will be understood that the invention is not limited to the specific form of the device illustrated, but is capable of modification within the scope of the appended claims.

We claim:

1. In a vacuum type coffee maker, a water heating vessel, a coffee infusion vessel adapted to receive loose ground coffee, said infusion vessel being disposed above said water heating vessel during operation of the coffee maker, said infusion vessel having a tubular portion extending downward into said water heating vessel for transferring liquid between the vessels, a foraminous container adapted to receive and compress a relaitvely small predetermined quantity of ground coffee, and adapted to be disposed in the lower part of said infusion vessel and to normally close the upper end of said tubular portion, and means for so securing said container in position as to permit the same to rise under the pressure of heated water rising in said tubular portion, whereby substantially all of the rising water passes around said container into direct contact with the loose ground coffee in the infusion vessel, and said container then closes the upper end of said tubular portion forcing the coffee beverage to pass through the compressed ground coffee in said container to filter the beverage.

2. In a vacuum type coffee maker, a water heating vessel, a coffee infusion vessel adapted to receive loose ground coffee, said infusion vessel being disposed above said water heating vessel during operation of the coffee maker, said infusion vessel having a tubular portion extending downward into said water heating vessel for transferring liquid between the vessels, the water rising through said tubular portion when heated and creating a vacuum in said water heating vessel which draws the beverage downward, a foraminous container adapted to receive and compress a quantity of ground coffee, and adapted to be disposed in the lower part of said infusion vessel above said tubular portion, and means for causing substantially all of the rising heated water to pass around said container into direct contact with the loose ground coffee in the infusion vessel, and for causing the coffee beverage to pass downward through the compressed ground coffee in said container under the impetus of the vacuum formed in said water heating vessel, thereby to filter the beverage.

3. A vacuum type coffee maker as defined in claim 2, wherein said container comprises two parts, and attachment means therefor including cam surfaces which effect compression of the ground coffee within the container.

4. In a vacuum type coffee maker, a water heating vessel, a coffee infusion vessel adapted to receive loose ground coffee, said infusion vessel being disposed above said water heating vessel during operation of the coffee maker, said infusion vessel having a tubular portion extending downward into said water heating vessel for transferring liquid between the vessels, said infusion vessel also having a recess at the upper end of said tubular portion and below the body portion of the vessel, a foraminous container adapted to receive and compress a relatively small predetermined quantity of ground coffee, and adapted to be disposed in the lower part of said infusion vessel and to normally close the upper end of said tubular portion, and a spring member secured to the bottom of said container and adapted to seat in said recess, said spring member serving to secure said container in position and permitting the same to rise under the pressure of heated water rising in said tubular portion, whereby substantially all of the rising water passes around said container into direct contact with the loose ground coffee in the infusion vessel, and said container then closes the upper end of said tubular portion forcing the coffee beverage to pass through the compressed ground coffee in said container to filter the beverage.

EMIL WALDER.
JOSEPH W. MYERS.